United States Patent [19]

Hayashi et al.

[11] Patent Number: 4,752,488
[45] Date of Patent: Jun. 21, 1988

[54] METHOD OF INJECTING VISCOUS FLUID INTO BREAD OR CONFECTIONERY

[76] Inventors: Torahiko Hayashi, 3-4; Sigeru Aoki, 228-13, both of Nozawa-machi, Utsunomiya-shi, Tochigi-ken, Japan

[21] Appl. No.: 815,445

[22] Filed: Dec. 31, 1985

[51] Int. Cl.$^4$ .......................... A21C 9/06; A21C 11/18
[52] U.S. Cl. .................... 426/281; 426/282; 426/283; 426/284; 426/94; 99/450.7; 99/450.8; 425/138; 425/131.1
[58] Field of Search ............... 426/281, 282, 283, 284, 426/94; 99/450.7, 450.8; 425/138 R

[56] References Cited

U.S. PATENT DOCUMENTS

| | | | |
|---|---|---|---|
| 1,782,596 | 11/1930 | Beilgard | 426/283 |
| 3,465,693 | 9/1969 | Lopata | 426/281 |
| 3,556,808 | 1/1971 | Panek | 426/281 |
| 3,804,954 | 4/1974 | Clardy | 426/281 |
| 4,207,046 | 6/1980 | Ayala et al. | 426/282.1 |

Primary Examiner—Jeanette Hunter
Attorney, Agent, or Firm—Guy W. Shoup

[57] ABSTRACT

A method of injecting viscous fluid into bread or confectionery is provided. Viscous fluid is drawn by a piston from a hopper through a 3-port valve into the chamber of a first piston cylinder, and after changing the position of the valve the viscous fluid is extruded through a tube and a reciprocally movable nozzle into a product while the nozzle is being retracted.

According to the present invention, the relation between the time of retraction of an injection nozzle from bread or confectionery and the stroke and time of extrusion by a piston is adjusted, so that the position, amount, and length of the viscous fluid charged in the product can be freely varied.

6 Claims, 2 Drawing Sheets

METHOD OF INJECTING VISCOUS FLUID INTO BREAD OR CONFECTIONERY

BACKGROUND OF THE INVENTION

1. Field of the Invention

The present invention relates to a method of injecting viscous fluid such as jam or cream into bread or confectionery, and particularly to a method of injecting viscous fluid into a product in a quantitatively and positionally regulated manner and on a continuous basis.

2. Description of Prior Art

Devices for charging, for example, cream into bread or confectionery, are known, and they include a switching valve, a piston and a nozzle. The nozzle is inserted into a product to inject and charge the cream in the product in that position. However, the charging devices have been designed to deal with products of a single shape or length, and have been unable to control the charging length of the filler. Further, in these devices, the nozzle is inserted into a product to charge the cream in the product, and the state of the filler in the product cannot be observed with the naked eye. Therefore, even if foreign matter is mixed into the filler material or the filler clogs in the nozzle or in a tube leading to the nozzle, thereby obstructing the delivery of the filler material to be charged in a product, such an error cannot be detected in the conventional devices.

Accordingly, products having the filler insufficiently charged cannot be distinguished from products having the filler charged properly, and, as a result, the filler is not always uniformly charged in the products, thus lowering the quality of the products.

Japanese Patent Publication No. 49464/85 teaches a device for charging a viscous filler such as chocolate cream into a split formed in the upper surface of bread. The device comprises a rotary valve, pump means for pushing the filler through the rotary valve into a cylinder, cylinder means for extruding the filler through the rotary valve to a discharge port for the filler, and shutter means for opening or closing the discharge port. Although this device can charge a controlled amount of the viscous filler into the split of bread, it has the pump means and shutter means in addition to the rotary valve and cylinder means, resulting in a complex mechanism which leads to high costs. Furthermore, this device has no nozzle through which a viscous filler is injected into bread.

SUMMARY OF THE INVENTION

An object of the present invention is to provide a method of injecting viscous fluid into products such as bread or confectionery, in which the position, quantity, and length of a filler can be optionally determined to meet changes in the shape and size of supplied products.

Another object of the present invention is to provide a method in which, when a filler to be charged in a product cannot be filled in predetermined quantity due to irregularities such as the presence of an obstacle in the charging nozzle, such a charging error can be readily detected so that only products having the filler charged in the predetermined quantity can be supplied to the next process, thereby improving the quality of the products.

In accordance with one aspect of the present invention, there is provided a method of injecting viscous fluid into bread or confectionery, consisting of the repetition of the steps comprising:

opening the passage from a hopper to the chamber of a first piston cylinder by moving a valve, while closing the passage from the chamber of the first piston cylinder to an injection nozzle;

sucking a predetermined amount of viscous fluid into the chamber of the first piston cylinder by retracting the piston thereof;

inserting an injection nozzle into a product by a predetermined distance by advancing the piston of a second piston cylinder;

opening the passage from the chamber of the first piston cylinder to the injection nozzle by moving the valve, while closing the passage from the hopper to the chamber of the first cylinder;

retracting the injection nozzle to the original position by retracting the piston of the second piston cylinder, while extruding the viscous fluid by advancing the piston of the first piston cylinder; and confirming the end of the extruding operation.

In accordance with another aspect of the present invention, there is provided a method of injecting viscous fluid into bread or confectionery, characterized in that the location of the viscous fluid in the product in which it is filled, the filling quantity, and the dimensions of the space where the viscous fluid is filled are optionally determined, in one cycle of the injection process comprising switching the valve, sucking the viscous fluid by retracting the piston of a first cylinder, inserting the injection nozzle into the product by advancing the piston of a second piston cylinder, switching the valve, and retracting the injection nozzle to the original position and extruding the viscous fluid, by adjusting the relationships between the time of withdrawal of the nozzle from the product, the quantity extruded by the piston, and the time of extrusion.

According to the present invention, sucking viscous fluid into the chamber of the first piston cylinder may be carried out at the same time as the insertion of the injection nozzle into the product and before the insertion is completed.

The step for the opening of the passage from the chamber of the first piston cylinder to the injection nozzle after the completion of the sucking operation may be carried out during the insertion of the injection nozzle.

Furthermore, sucking by the first piston cylinder may be commenced before the passage from the chamber of the first piston cylinder to the nozzle is completely closed.

According to the present invention, the relation between the time of retraction or withdrawal of the nozzle from the product and the stroke of the first piston cylinder and the time of extrusion from it is adjusted, so that the position, quantity, and length of the viscous fluid charged in the product can be optionally varied.

DESCRIPTION OF THE PREFERRED EMBODIMENT

An embodiment of the present invention will now be described with reference to the drawings.

Figure 1:
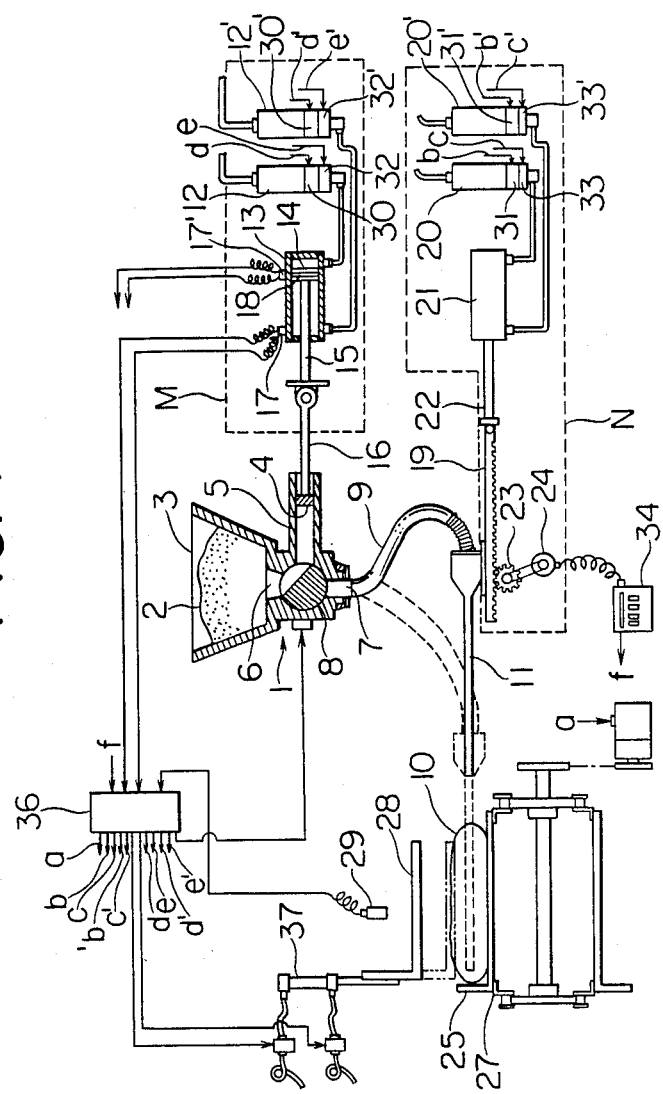
FIG. 1 is a schematic side elevation view, partially in cross-section, of an embodiment of the present invention.

In FIG. 1, a valve mechanism 1 has a rotary valve 8, and an inlet port 6, an outlet port 7. A hopper 3 containing a filler 2 is mounted on the valve mechanism 1 to communicate with the inlet port 6.

A first piston cylinder 5 is connected to the valve mechanism 1 through a side port (not shown by a number) to communicate with the inlet port 6 and the outlet port 7 as the valve 8 is rotated. The first piston cylinder 5 has a piston 4 to which a piston rod 16 is connected.

How to drive the piston 4 will now be described.

Air-hydro converters 12, 12' converting air pressure to oil pressure, stop valves 30, 30' and actuators 32, 32' connected to a third piston cylinder 13, used to ensure stable movement of the piston 4. A piston rod 15 connected at one end to a piston 14 in the third cylinder 13 is pivoted at the other end to the piston rod 16 of the piston 4. Magnetic type proximity switches 17, 17' are mounted on the third cylinder 13, and a magnetic ring 18 is fitted on the piston 14. Therefore, for example, when the piston 14 moves to arrive at the position of the proximity switch 17', the proximity switch 17' detects the magnetic ring 18 and transmits a detection signal to a programmable sequence controller 36. Since the sequence controller 36 is electrically connected to the stop valves 30, 30' and actuators 32, 32' for transmitting a predetermined signal to them, the moving distance of the piston 14, i.e., the moving distance of the piston 4, can be adjusted by the action of the actuators 32, 32', which control hydraulic power toward the third piston cylinder 13.

Furthermore, the actuators 32, 32' have a function to control the speeds of the piston 14 of the third piston cylinder 13 by regulating said hydraulic power.

References d, d' and e, e' stand for signals to be transmitted from the sequence controller 36 to the stop valves 30, 30' and the actuators 32, 32', respectively.

The combination of the air-hydro coverters 12, 12', stop valves 30, 30', actuators 32, 32', the third piston cylinder 13, piston 14, piston rods 15 and 16, magnetic type proximity switches 17, 17', and magnet ring 18, will be generally referred to hereinafter as a first control system M.

The nozzle 11 is fixed to a rack 19, which can move in the direction of the insertion of the nozzle 11 into the product 10.

The rack 19 is connected at one end to a piston rod 22 driven into and out of a second piston cylinder 21 by the combination of separately provided air-hydro converters 20, 20', stop valves 31, 31', and actuators 33, 33'. The degree of movement of the rack 19 is detected by a rotary encoder 24, which is rotated by a pinion gear 23 making meshing engagement with the rack 19. The combination of the rack 19, air-hydro converters 20, 20', stop valves 31, 31', actuators 33, 33', second piston cylinder 21, piston rod 22, pinion gear 23, and rotary encoder 24, will be generally referred to hereinafter as a second control system N.

The depth of the insertion of the nozzle 11 into the product 10 is set by numerical valves which the operator inputs to a counter 34 mounted on a control panel. When the count by the rotary encoder 24 showing the progress of the rack 19 during the inserting operation equals the set value, the counter 34 transmits a signal indicated as "f" to the sequence controller 36. Based upon the signal "f," the sequence controller 36 directs an actuation signal to the stop valves 31, 31' to stop the insertion and provide the desired depth of insertion of the nozzle 11.

The speed of the insertion of the nozzle 11 into the product 10 can be controlled by the actuators 33 and 33' which operate in response to the command from the programmable sequence controller 36.

The speed of the extrusion from the piston 4 can also be controlled by the actuators 32 and 32' which operate in response to the command from the programmable sequence controller 36, so that the controller 36 control the timing of the insertion and retraction of the nozzle 11 and the extrusion.

The quantity of the filler 2 to be injected into the product 10 can be previously determined by adjusting the positions of the proximity switches 17 and 17', namely, these positions correspond to a top dead center and a bottom dead center of the piston 14, respectively.

A product supply conveyor 27, having product supports 25, travels in a direction orthogonal to the moving direction of the nozzle 11. In FIG. 1, reference "a" stands for a signal which is transmitted from the sequence controller 36 to a motor for driving the conveyor 27. A holding plate 28 is above the conveyor 27 and moves downward to hold the product 10 while the filler 2 is charged in the product 10. A product sensor 29, near the supply conveyor 27, detects the product 10 when it is at a predetermined position, where the filler 2 is to be charged.

The relation between the operating time of the nozzle 11 and that of the piston 4 will now be described by reference to the operation time chart shown in FIG. 2.

Figure 2:
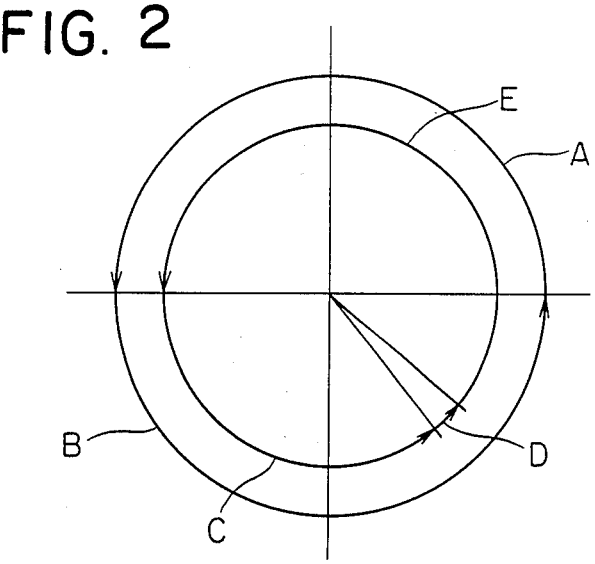
FIG. 2 is a time chart explaining the charging operation.

In FIG. 2, "A" means the time zone for the advancing movement of the nozzle 11, and "B" means the time zone for the retracting movement of the advanced nozzle 11. The time periods of the time zones "A" and "B" are not necessarily the same. One cycle includes the advance and retraction of the nozzle 11 to its original position.

"C" means the time zone for the extruding movement of the piston 4, and "D" and "E" mean the time zones for the sucking movement of the piston 4. Also, in the time zone "D," the rotary valve 8 is in the position to close the passage leading to the hopper 3. Therefore, the suction by the piston 4 in this time zone exhibits the effect of a negative pressure in the nozzle 11, so that dripping of the filler 2 from the tip of the nozzle 11 is prevented while the tip of the nozzle 11 is taken out from the product 10. This time zone "D" is very short. In the time zone "E," the rotary valve 8 opens the passage from the first piston cylinder to the hopper 3 and closes the passage leading to the nozzle 11. Therefore, the suction by the piston 4 has the effect of filling the filler 2 in the chamber of the first piston cylinder 5.

The manner of control will now be described. The amount of the filler 2 is proportional to the distance of movement of the piston 4 in the first piston cylinder 5. Although this distance is changed by the operator manipulating the dial, the sequence controller 36, actuates the air-hydro converter 12, 12' in the first control system M so that the corresponding amount of filler material 2 can always be charged within a a constant time.

Figure 3:
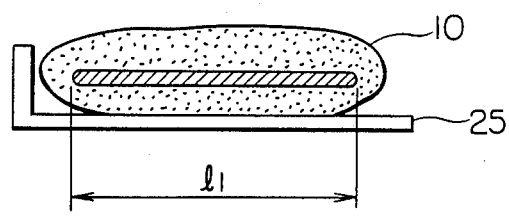
FIGS. 3 and 4 illustrate bread and a filler charged therein, placed on a product support.
Figure 4:
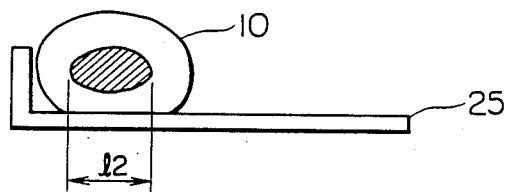

As shown in FIG. 3 and FIG. 4 the length l1 or l2 of the filler 2 charged in the product 10 is variable. It is determined by changing the time period of the time zone of the extruding movement of the piston 4 during the retracting movement of the nozzle 11.

The time period of the time zone C of the extruding movement of the piston 4 is changed by the operator manipulating the dial, and the sequence controller 36 generates and transmits signals to the actuators 33 and 33' so as to adjust the filled quantity in each cross-section in the product 10.

These operations can be achieved by applying the data on the required advancing period of time and required retracting period of time of the nozzle 11 to the programmable sequence controller 36, together with the data of the retracting distance.

The injecting operation is repeated automatically in accordance with data freely set in a manner as described above, but it is interrupted if the extruding operation of the piston 4 for injecting a predetermined length of the filler is obstructed for some reason.

That is, since the function of the proximity switch 17, in the first control system M is adapted to sense the end of the extruding operation of the piston 4 and to transmit the detection signal to the sequence controller 36, if it does not detect the arrival of the piston 14 even after the lapse of a predetermined time which is programmed in the sequence controller 36 and the sequence controller 36 receives no detection signal, the sequence controller 36 generates no command to cause the rotary valve 8 to open the passage from the hopper 3 to the chamber of the first piston cylinder 5. Therefore, the next operation does not take place.

Because of the above feature, the impossibility of the extrusion of the filler material 2 due to plugging of the nozzle 11 with an obstacle or the like is sensed, and the operation is automatically interrupted. Thus, the occurrence of an inadequately charged product can be readily detected.

As described above, the present invention can provide a method which finds a wide range of applications in that the position and length of a filler material charged in products can be freely selected to meet changes in the shape and size of supplied products.

Further, when a filler material to be charged in a product cannot be charged due to the presence of an obstacle in the nozzle and for other reasons, such a charging error can be readily detected. Thus, no sampling test is required, but nevertheless rejects can be readily detected.

Also, in FIG. 1, references b, b' and c, c' stand for signals to be transmitted from the sequence controller 36 to the stop valves 31, 31' and the actuators 33, 33', respectively. Reference 37 stands for an actuator to carry the holding plate 28 up and down.

We claim:

1. A method of injecting viscous fluid into bread or confectionery product comprising the following steps:

(a) opening a first passage from a hopper for the viscous fluid to a chamber of a first piston cylinder by moving a valve, while closing a second passage from the chamber of the first piston cylinder to an injection nozzle, (b) sucking a predetermined amount of viscous fluid into the chamber of the first piston cylinder by retracting the piston thereof, and detecting by means of a first proximity switch when the piston has arrived at a first position in order to terminate the sucking operation, (c) inserting the injection nozzle into a bread or confectionery product by a predetermined distance by advancing the piston of a second piston cylinder, (d) opening the second passage from the chamber of the first piston cylinder to the injection nozzle, while closing the first passage from the hopper to the chamber of the first piston cylinder by moving the valve, (e) retracting the injection nozzle to its original position by retracting the piston of the second piston cylinder, while extruding the viscous fluid into the bread or confectionery product through the injection nozzle by advancing the piston of the first piston cylinder, and detecting by means of a second proximity switch when the piston has arrived at a second position in order to terminate the extruding operation, and (f) continuing a further injecting operation with step (a) above if the piston of the first piston cylinder arrives at the second position within a predetermined length of time, or discontinuing a further operation if it has not arrived at the second position within the predetermined length of time.

2. A method of claim 1, in which sucking viscous fluid into the chamber of the first piston cylinder is carried out at the same time as the insertion of the injection nozzle into the product and before the insertion is completed.

3. A method of claim 2, in which the step for the opening of the passage from the chamber of the first piston cylinder to the injection nozzle is carried out during the insertion of the injection nozzle after the completion of the sucking operation.

4. A method of claim 1, in which sucking by the first piston cylinder is carried out before the passage from the chamber of the first piston cylinder to the nozzle is completely closed.

5. A method of claim 2, in which sucking by the first piston cylinder is carried out before the passage from the chamber of the first piston cylinder to the nozzle is completely closed.

6. A method of claim 3, is which sucking by the first piston cylinder is carried out before the passage from the chamber of the first piston cylinder to the nozzle is completely closed.

* * * * *

UNITED STATES PATENT AND TRADEMARK OFFICE
CERTIFICATE OF CORRECTION

PATENT NO. : 4,752,488
DATED : June 21, 1988
INVENTOR(S) : Torahiko Hayashi and Sigeru Aoki It is certified that error appears in the above-identified patent and that said Letters Patent is hereby corrected as shown below:

Title page:

Please correct patent to indicate a FOREIGN APPLICATION PRIORITY DATA:

December 31, 1984 [JP] Japan .............59-276308

Signed and Sealed this

Twenty-fourth Day of January, 1989

*Attest:*

DONALD J. QUIGG

*Attesting Officer*        *Commissioner of Patents and Trademarks*